(12) United States Patent
Clark

(10) Patent No.: US 8,122,944 B2
(45) Date of Patent: Feb. 28, 2012

(54) COMBINED POTABLE WATER-SURFACE HEATING AND COOLING SYSTEM

(75) Inventor: Steven Joseph Clark, Aetna (CA)

(73) Assignee: Steven J. Clark, Provo, UT (US)

( * ) Notice: Subject to any disclaimer, the term of this patent is extended or adjusted under 35 U.S.C. 154(b) by 1401 days.

(21) Appl. No.: 11/580,636

(22) Filed: Oct. 12, 2006

(65) Prior Publication Data

US 2009/0101305 A1    Apr. 23, 2009

(51) Int. Cl.
    *B60H 1/00*    (2006.01)
    *F24D 19/02*   (2006.01)
    *F24D 19/10*   (2006.01)
    *F24F 3/00*    (2006.01)
    *F22B 37/00*   (2006.01)

(52) U.S. Cl. ............. 165/49; 165/50; 165/53; 165/11.2; 237/8 A; 237/2 A

(58) Field of Classification Search ............. 165/47, 165/49, 50, 53, 54, 56, 11.1, 11.2, 48.2; 237/69, 237/2 R, 8 A, 2 A, 1 R
See application file for complete search history.

(56) References Cited

U.S. PATENT DOCUMENTS

| 3,170,508 | A  | * | 2/1965 | Avery ........................... 165/221 |
| 5,394,935 | A  | * | 3/1995 | Glover .......................... 165/45 |
| 5,931,381 | A  | * | 8/1999 | Fiedrich ........................ 237/69 |
| 6,769,476 | B2 | * | 8/2004 | Schulz et al. ................. 165/56 |
| 6,883,590 | B1 | * | 4/2005 | Messana ....................... 165/56 |
| 2005/0183773 | A1 | * | 8/2005 | Sinclaire ..................... 137/357 |

* cited by examiner

*Primary Examiner* — Ljiljana Ciric
*Assistant Examiner* — Travis Ruby

(57) ABSTRACT

The present invention relates to a method of heating or cooling a series of indoor spaces using domestic hot water and cooling using domestic cold water systems as a source for an efficient and cost effective distribution system that distributes heating and cooling water that can be used in surface heating/cooling panels built directly into the building construction. These panels form part of the space walls and ceilings and form a cost effective and ascetically pleasing method of delivering heating and cooling to a space.

9 Claims, 6 Drawing Sheets

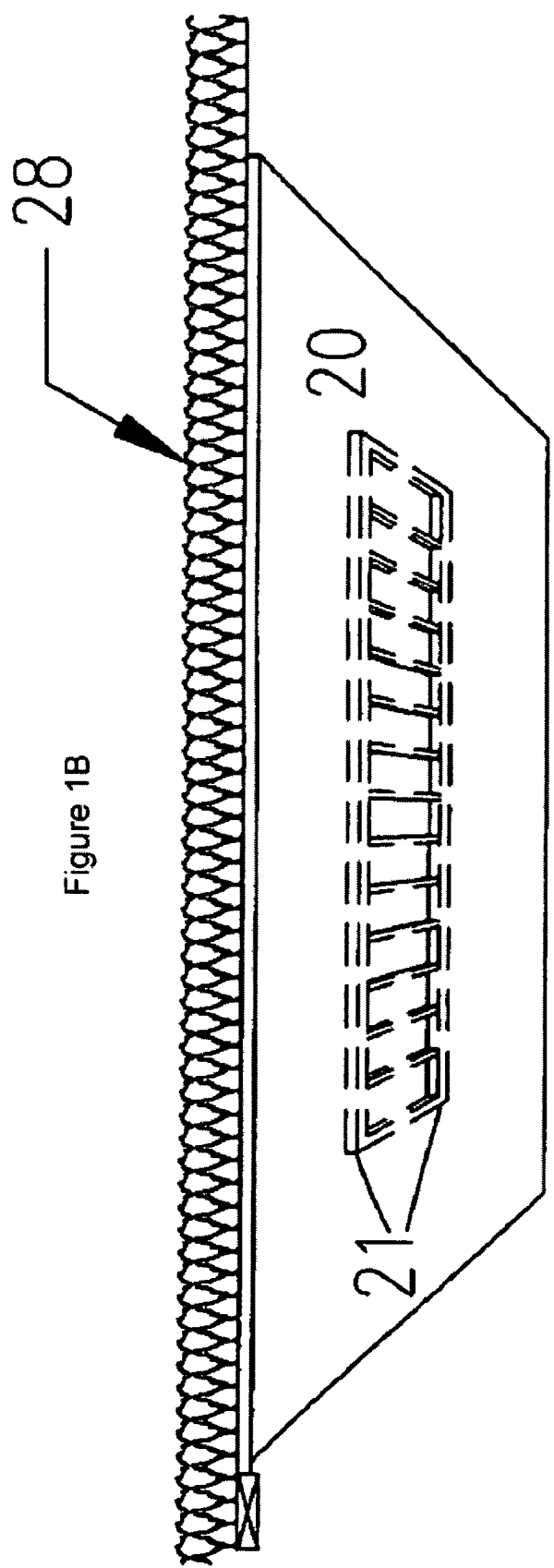

COMBINED POTABLE WATER-SURFACE HEATING AND COOLING SYSTEM

TECHNICAL FIELD OF INVENTION

The technical field to which this invention relates is space heating and cooling, more specifically hydronic space heating and cooling utilizing domestic or potable water as the working fluid and heat transfer tubing inserted directly in walls or ceilings.

BACKGROUND OF THE INVENTION

Historically buildings that had hydronic heating, cooling and plumbing systems would have three separate piping systems, one for each function. Numerous efforts have been made to combine some of these functions, such as, two pipe change-over systems which give the space either heating or cooling, but not both simultaneously. Combo heating systems which utilize domestic hot water for space heating typically do not utilize cooling and fan coil domestic water heating and cooling systems which utilize domestic hot water for space heating along with chilling domestic cold water to be used for space cooling in fan coils as well as to go to plumbing fixtures. Two pipe change-over systems do not provide the normally expected cooling and heating to be available at any time throughout the building and have generally fallen from favor. The combo heating systems do not address the delivery of space cooling from a central plant and therefore have inefficiencies. To combine the domestic hot and cold water with fan coil systems has several inefficiencies, most notably the waste of thermal energy of providing plumbing fixtures like toilets and showers with chilled water that has thermal energy invested in it, and the use of fan energy to transfer the heating and cooling effect to the space. The present invention utilizes the domestic hot water and cold water lines as part of a very efficient space heating and cooling delivery system. As is seen by incorporating the concept of low temperature surface (radiant) heating and cooling, multitude advantages are gained. Further it can be appreciated that the plumbing, heating and cooling system can be installed by a single plumbing contractor, eliminating the need for separate trades for sheet metal, mechanical, and plumbing. Further it can be appreciated that the low temperature radiant heat can be built directly into architectural features such as walls and ceilings of the space with minimal visual impact. Further it can be appreciated that most mechanical systems are not aesthetically pleasing and often introduce a metal object like a panel or grill into a room's design. Additional unforeseen advantages of the present invention are that it can be aesthetically pleasing, and that it can require no floor space, so it would be very attractive to interior designers and architects.

STATEMENT OF INVENTION

According to the object of the present invention to provide inexpensive space heating and cooling in a manner that is energy efficient, aesthetically pleasing, and uses no floor space, and is inexpensive initially, this innovative invention utilizes pipe registers that are built directly into wall or ceiling construction. These registers include supply and return manifolds and multiple heat transfer tubes. Registers can be either formed directly into wall or ceiling surfaces such as plaster, they can be located immediately behind surfaces like dry wall or above surfaces that allow air flow like a perforated panel. Low temperature domestic warm water is circulated through these panels to raise the temperature of the wall or ceiling surface by conduction to a temperature greater than the space temperature. By the known effect of radiation of those surfaces in the room are also warmed. The result is a room which feels warm even at a lower air temperature. After warm water has been cooled through heating the space it returns to the heating plant to be reheated.

In the summer time cooling is provided by circulating cooled but not chilled domestic cold water through the pipe register. This in turn through conduction cools the surface of the wall and the wall absorbs heat from surrounding objects and people and thereby provides a cool feeling space even with a relatively warm air temperature. This can be engineered in a manner that the surface temperature of the cooling system is kept above the dew point. A separate ventilation system may need to be provided to dehumidified fresh outside air to keep humidity levels within the comfort zone. After the cool water has warmed by gaining heat from the space it is then allowed to flow to fixtures or faucets.

An arrangement of valves and pumps is provided to circulate the warm domestic water from the heating plant, through the distribution system, through the pipe registers, and back. This system is integrated with the domestic hot water supply and return lines. Similarly a series of pumps and valves are utilized to circulate the cool water from the cooling source, through the distribution system, to the pipe register, and then returns back through the domestic cold water supply line. Unforeseen advantages of this system are that cold water to be used for showers is now preheated to room temperature by the system. Additional unforeseen advantages is that other systems utilizing domestic hot water floor space heating and floor space cooling normally have separate coils for heating and cooling. This means that during the season this coil is not in use stagnation of the water is a concern. This system utilizes one pipe register collection in a space for both heating and cooling thereby eliminating the concern of stagnation during off seasons. Additional advantages of integrating the heating and cooling system in one panel are the initial cost savings. Likewise cost savings are produced by combining the domestic hot and cold distribution systems with heating and cooling piping in this novel invention. Additional savings stem from a single domestic hot water heating plant is able to provide both space heating and domestic hot water heating. An additional unforeseen advantage to this system is by utilizing very warm cool water for space cooling this can often be achieved through the use of ground water either directly or via heat exchanger. This eliminates the need for compressors and their associated refrigerants and power consumption. An additional unforeseen advantage to this system is by utilizing very cool warm water for space cooling this can often be achieved through the use of solar or waste heat either directly or via heat exchanger. This eliminates the need for fossil fuel burning appliances and their associated energy consumption and pollution.

BRIEF DESCRIPTION OF THE DRAWINGS

The foregoing aspects and many of the attending advantages of this invention will become more readily appreciated as the said invention becomes better understood by the following detailed drawings wherein

Referring to FIG. 1 one can see a cutaway isometric view of the present invention incorporated into the architectural of a room 5. Wall 10 is a convention construction wall with tubing network 11 imbedded in the plaster surface 17. The tubing network 11 consists of one or more supply distribution headers 12. This supplies the register tubes 13, and in turn the tubes connect to return manifold header 14. The supply tube 15 brings either warm or cool domestic water to supply to header 12, which brings either warm or cool domestic water to the register tubes. The warm or cool water flows through the register tubes 13 and via thermal conduction the wall surface 17 temperature is warmed or cooled. The warming or cooling effect is than radiated to the other surfaces and objects in the space. The water in the register tubes 13 then flows into return header 14. Similarly water leaving return header 14 flows into return tube 16. In this example the tubing network is then imbedded directly into the wall construction material made of plaster.

Referring to FIG. 1 one can see a cutaway isometric view of the present invention incorporated into a prefabricated wall panel 25. This panel is factory assembled with an interior surface 23 (usually gypsum board), an insulating core 26, and an exterior surface 24. The tubing network 11 is embedded in the wall panel 25, is in thermal contact with interior surface 23. The tubing configuration is the same as in the above wall construction.

FIG. 1 also shows the surface heating/cooling panels built into a ceiling 20. In this case the tubing network 21 is located above the finished material, in this case gypsum board. The gypsum board material is located immediately below and in thermal contact with the tubing network. In this case immediately above the tubing network would be a thermal and moisture barrier number 28 such as fiberglass insulation with an aluminum foil on the underside. The tubing configuration is the same as in the wall construction.

Figure 1:
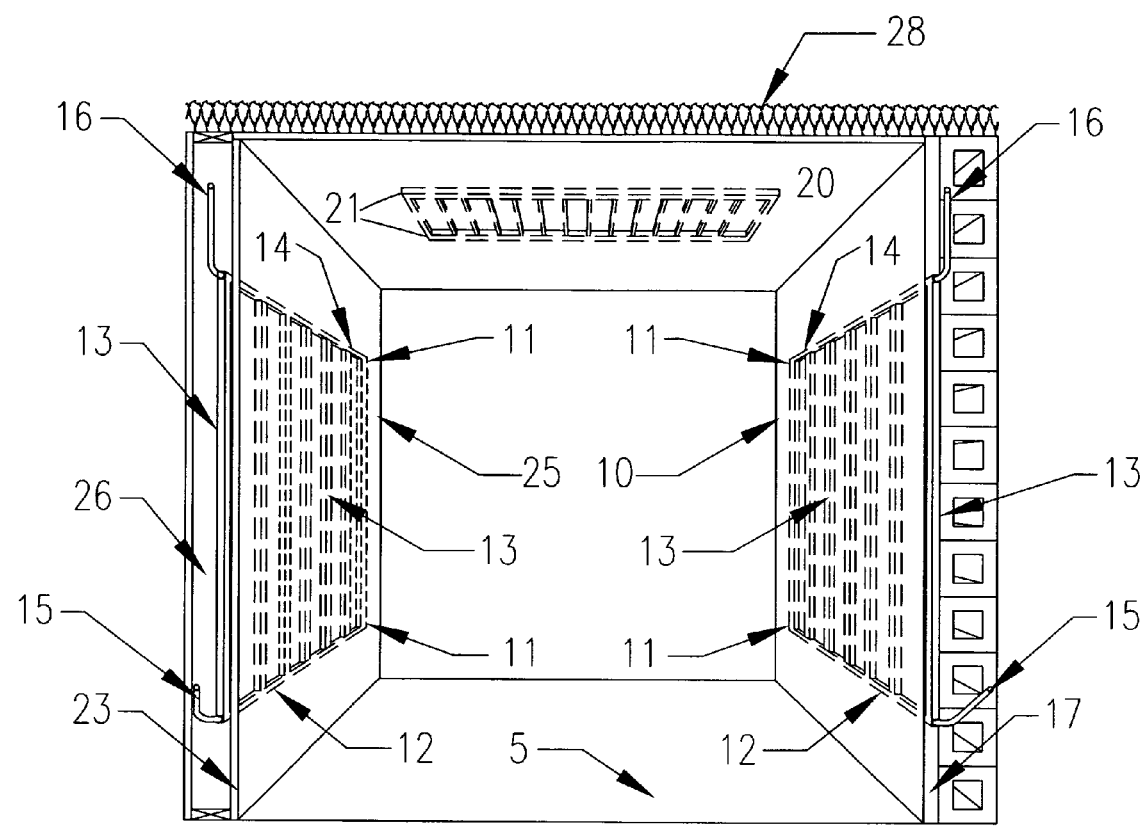
FIG. 1 is the isometric cutaway of the present invention installed in a room, specifically in two architectural walls and a ceiling.
Figure 1A:
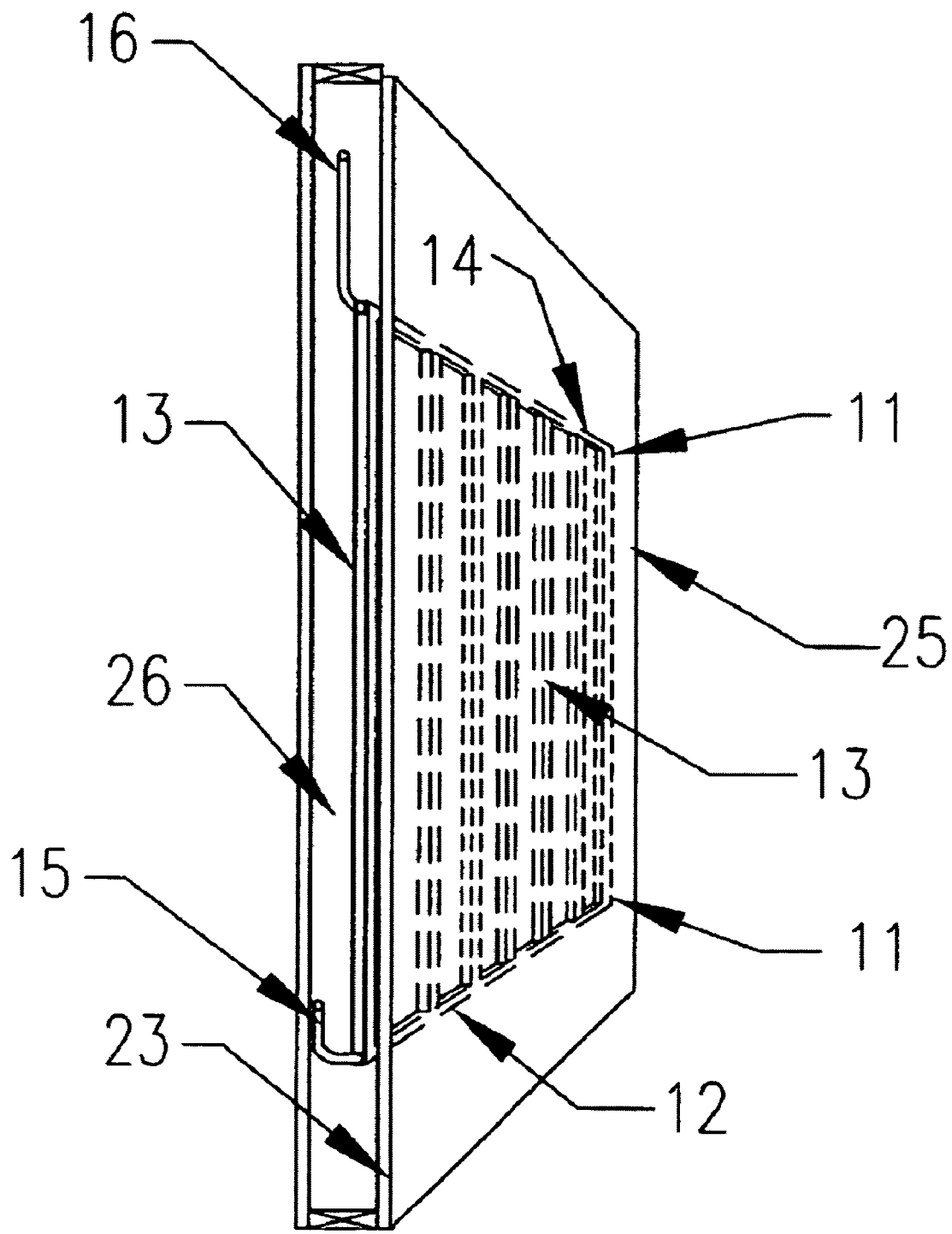
Figure 1C:
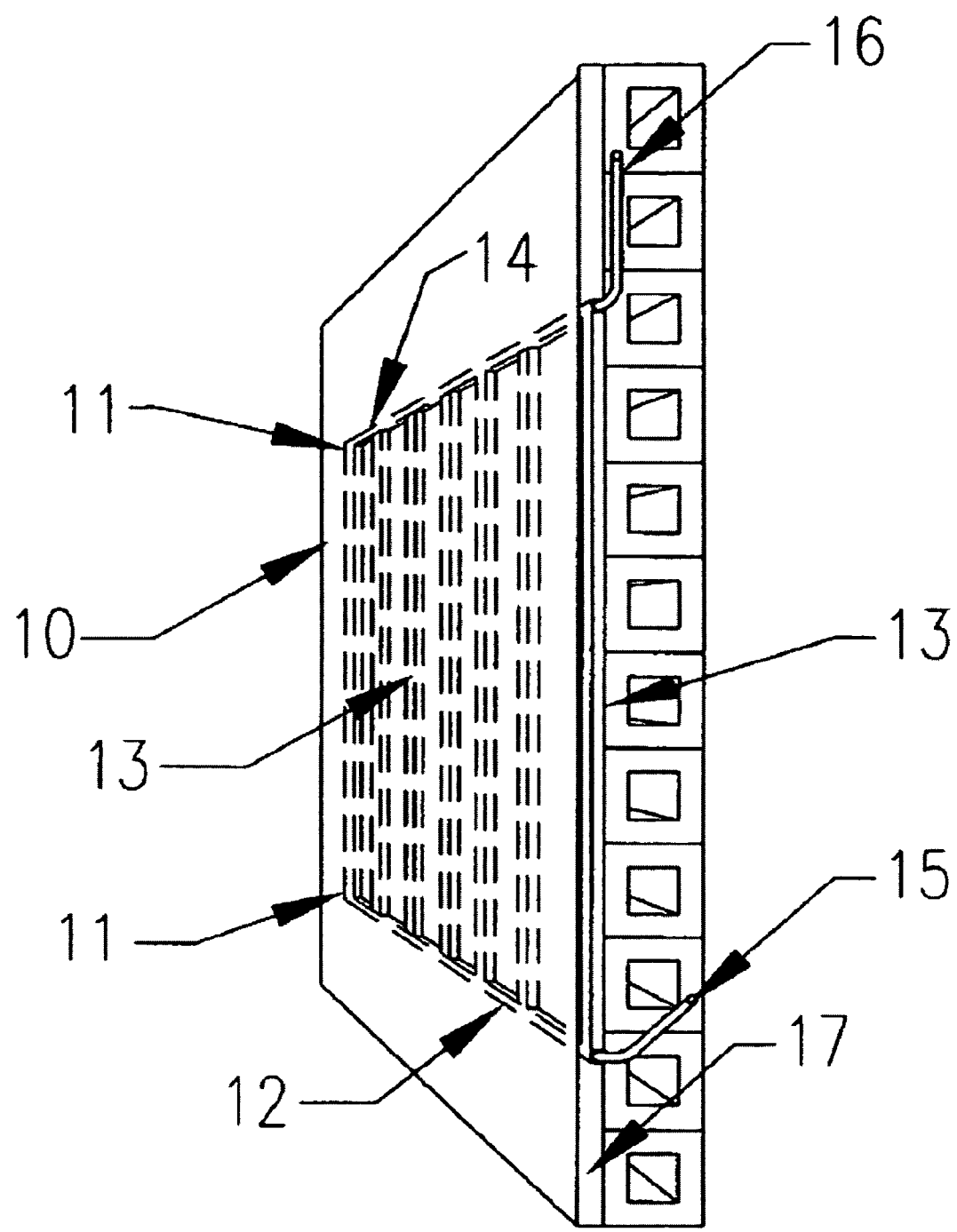
Figure 2:
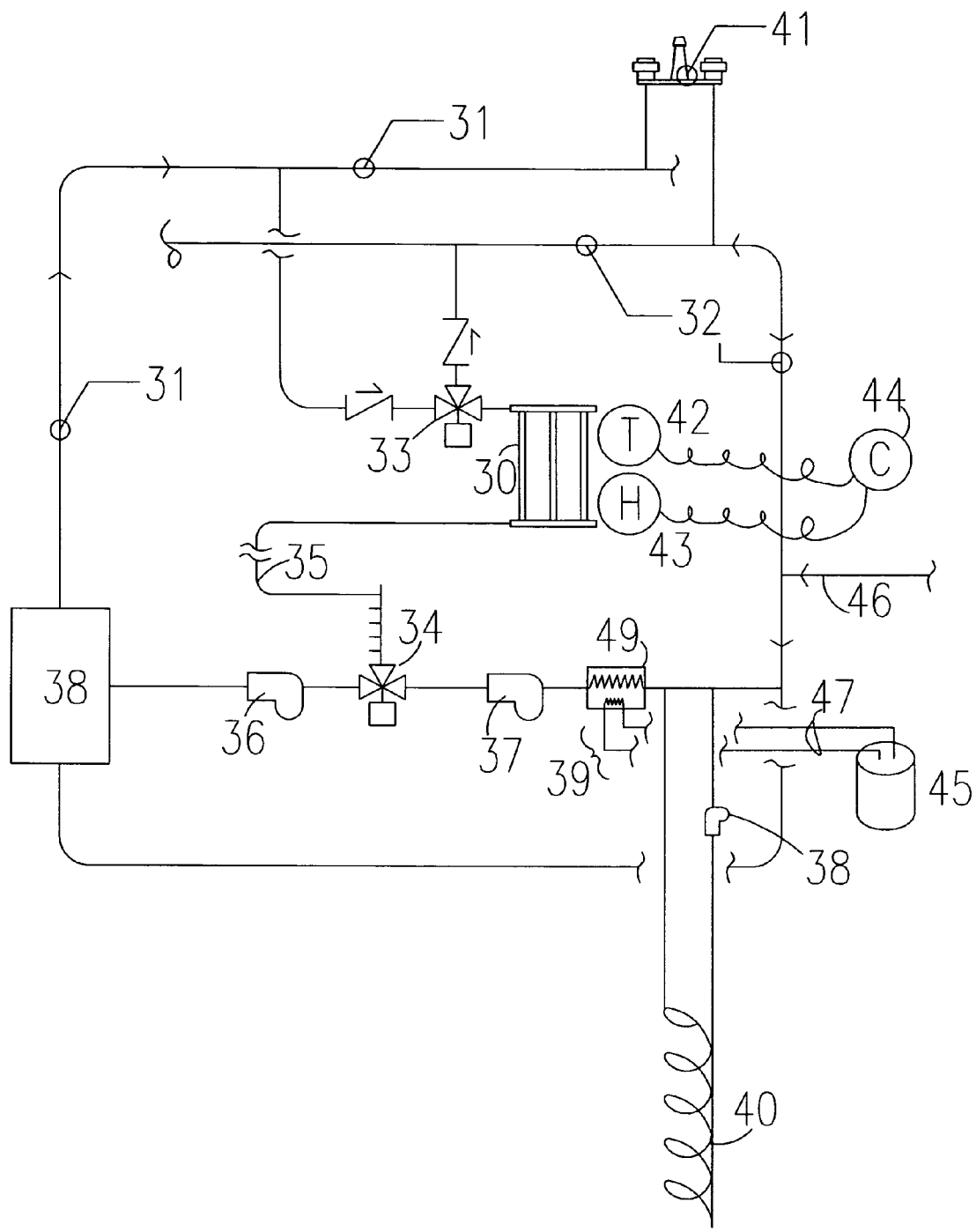
FIG. 2 is a schematic representation of the present invention installed in a small commercial or residential construction.

The heating/cooling surface panels are shown in the domestic hot/cold water heating system in FIG. 2. In this schematic we can see that the wall and/or ceiling in the heating/cooling panel 30 are connected to the domestic hot water piping 31 and the domestic cold water piping 32 through a series of valves 33 and 34 and pumps 36 and 37. These pumps and valves can direct water flow either through the heating source 38 or through cooling source 39 or the optional ground coil 40 and ground coil pump 48. As would be the case in normal construction the domestic hot and cold water lines are connected to typical plumbing fixtures such as faucets, showers and toilets as represented by plumbing fixtures 41. Space temperature sensors 42 and humidity sensors 43 provide control signals sent to control 44. Component 44 controls the operation of the valves, pumps and heating and cooling sources to provide warm or cool water flow to the appropriate to heating/cooling panels can achieve the desired space temperatures. To replace water used in fixtures 41, the source of city or potable water 46 is connected to the system. The cooling source 39 can be a convective chiller (either air or water source) or can be a split chiller with an outdoor condensing unit (not shown) or an outdoor air cooled chiller 45 with a glycol loop 47 to a heat exchanger 49. It is appreciated that the chiller 45 can be a reverse cycle chiller/heat pump and also then provides heat to the appropriate season. In operation in the cooling mode cool water is forced to flow through the heating/cooling wall panel 30 from the cool water supply line 35. Control valve 34 is used to select flow from cool water supply pump 37. The water is cooled by cooling source 39 with additional cooling provided by ground water coil 40 when ground water coil pump 48 is activated. After the water leaves heating/cooling panel 30 it flows through the routing valve 33 which directs the water to the domestic cold water supply line. At this point the water can be utilized by plumbing fixture 41 for normal domestic cold water uses such as flushing toilets, in faucets, or in showers. Advantageously this water has been warmed up to nearly space temperature thereby reducing the amount of hot water needed for showers or other uses. If domestic cold water is not needed the water is allowed to flow backwards through the domestic cold water line to the cooling sources 39 and 40 by means of cool water supply pump 37. The water is then allowed to repeat the cycle. As water is used in plumbing fixture 41, additional water replaces it through city water connection 46.

Similarly when space temperature sensor 42 senses a need for heat in a space, diverting valve 33 draws hot water from domestic hot water supply line 31 and water is forced to flow through the heating/cooling panel 30. After dissipating the heat to the space the cooler warm water returns through hot water return line 35 (note: dual use with chilled water supply line) back to diverting valve 34. The cooled warm water is then circulated by hot water return pump 36 to the heating source 38. The heated water is mixed with city water to provide domestic hot water supply 31 out to the building. This warm water is then available for use in plumbing fixtures 41 or reuse in heating/cooling panels 30.

The operation of this system is controlled by controller 44 which monitors space temperatures 42 and indoor humidity 43. This valve has control of the pumps and valves as well as heating and cooling sources. The controller of the cold water supply temperature ensures that condensation does not form on any surfaces throughout the building system.

Figure 3:
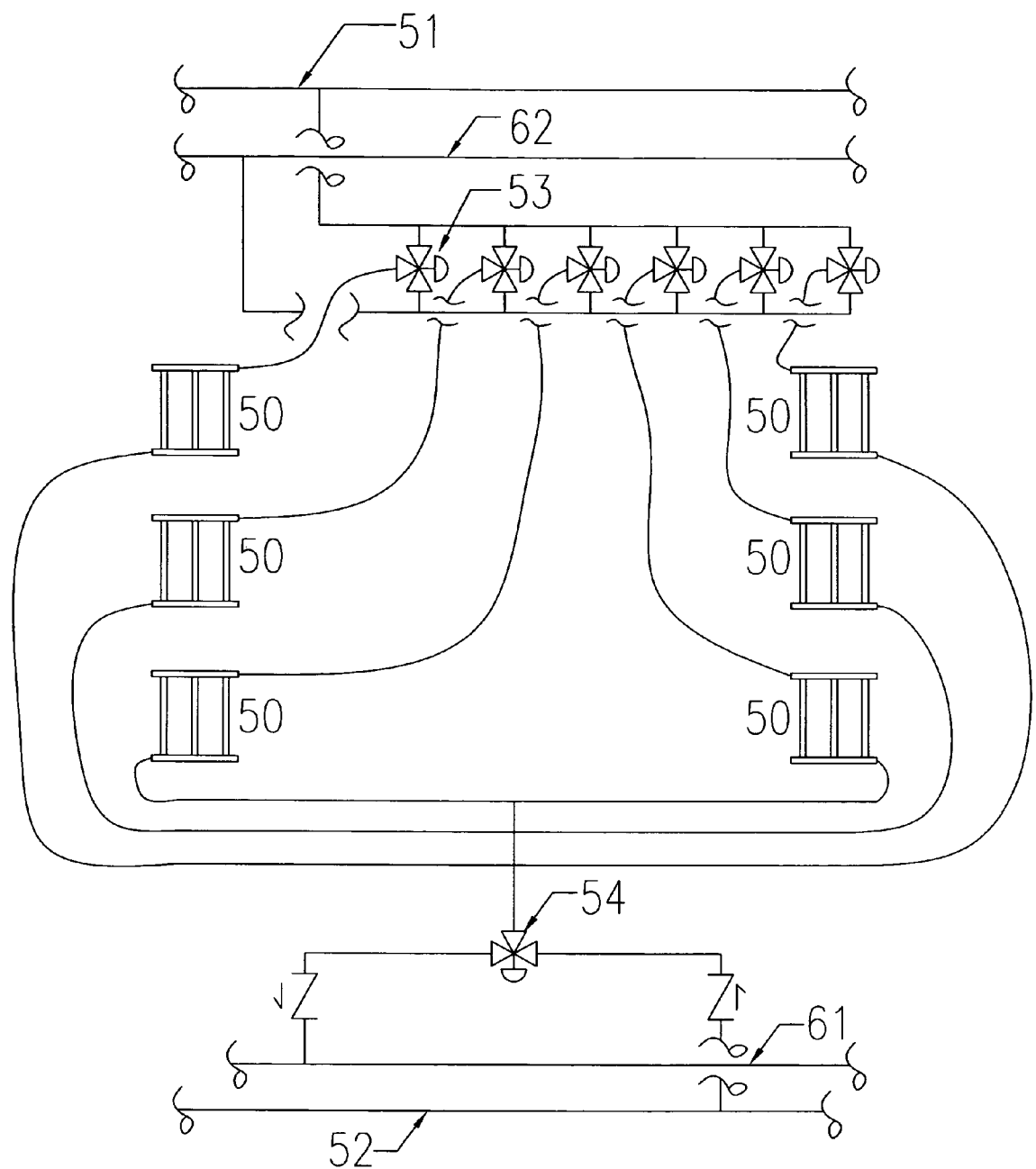
FIG. 3 is a schematic representative of the present invention installed in a large scaled commercial or multilevel residential construction.

FIG. 3 shows a section of a schematic of the system installed in multiunit residential construction or large commercial construction. The central heating and cooling plants are not shown and are assumed to be at a central remote location. This schematic shows six surface heating/cooling panels located in a section of a large building. These panels are connected by a series of valves and/or pumps to the domestic hot water supply line 51, the domestic cold water supply line 52, domestic hot water return line 61 and domestic cool water return line 62. Diverting valves 53 and 54 are utilized to select either warm or cold water to flow through heating/cooling lines 50 to satisfy the thermal conditions of the space. Heating and cooling sources are not shown in this schematic. In operation the heating and cooling sources would provide warm or cool water in hot water supply line 51 and cool water in the cool water supply line 52. These heating and cooling plants would have pumps (not shown) which would also draw return hot water from hot water return line 61 and returning cool water from cool water return line 62. When a space calls for heating or cooling diverting valves 53 or 54 would open to the appropriate hot or cold supply lines. Water would be allowed to flow through the surface heating/cooling panels 50 and would return to the appropriate return lines. Through understood operation of low temperature radiant heat transfer, these spaces would be warmed or cooled and the water within the panels would also be cooled or warmed and then returned to the appropriate heating and cooling plants.

Although described above are two configurations of integrated domestic hot and cold water systems with surface heating/cooling panels, it can be appreciated by those skilled in the art that there are other methods of construction and location for the panels, control systems, and heating and cooling sources. It can also be appreciated that the surface heating and cooling panels do not provide dehumidification;

other means of humidification may be necessary where dehumidification is needed. As can be seen in the description above surface heating and cooling may be accomplished utilizing this novel invention combined with heat exchange devices to cool or heat domestic water. Moreover, in contrast with prior art the integrated domestic water surface heating and cooling system would be relatively simple to manufacture and install, it uses a minimum amount of piping, it can be incorporated in construction of a space, and avoids the concern of stagnant water found in other domestic water heating systems, and is cost effective to install.

It is of course to be understood that the invention is not intended to be restricted to the details of the above embodiments which are described by way of example only.

The invention claimed is:

1. A heating and cooling system comprising:
    a structure, wherein the structure has an interior with one or more walls and a ceiling;
    said one or more walls and ceiling having a construction surface;
    surface heating/cooling panels located as an intricate assembly of the one or more walls or ceiling;
    wherein the surface heating/cooling panels comprise a plastic tubing network;
    said plastic tubing network supplying domestic hot and cold water to the surface heating/cooling panels from a domestic hot and cold water distribution system;
    wherein the plastic tubing network is built into, on or behind ceiling or wall construction, finishes or coverings;
    wherein a heating source is provided to heat said domestic hot water and a cooling source is provided to cool said domestic cold water and
    one or more valves are provided to control the flow of the domestic water into and through the surface heating/cooling panels, and
    one or more pumps are provided to circulate said domestic water to the domestic water distribution system,
    wherein the domestic cold water is drawn from the domestic cold water distribution system and distributed to the surface heating/cooling panels and then returned to the domestic cold water distribution system for use in other plumbing fixtures and/or returned to domestic cold water cooling source;
    wherein the domestic hot water is drawn from the domestic hot water distribution system and distributed to the surface heating/cooling panels and then returned to the domestic hot water distribution system for use in other plumbing fixtures and/or returned to the domestic hot water heating source;
    a thermostat or temperature sensor for sensing the interior temperature of the structure;
    and a humidistat or humidity sensor for sensing the interior humidity of the structure;
    a controller connected to the thermostat or temperature sensor and humidistat and humidity sensor;
    wherein the controller is provided for controlling the one or more valves and the one or more pumps such that the temperature and flow rate of the domestic water entering the panels is regulated based on the sensed temperature and humidity from the thermostat and humidistat;
    wherein the controller of the system operates in a manner which provides thermal comfort within the space by varying the flow of warm or cool fluid to the panels,
    said controller maintains a fluid temperature in the surface heating/cooling panels above the dewpoint as sensed by the humidity and temperature sensors in order to prevent condensation from forming on the heating/cooling panels, and
    said controller maintains a minimum flow of domestic water through the panels, thereby eliminating the concern of the water being stagnant in the panels.

2. The system according to claim 1, wherein the plastic tubing is polypropylene.

3. The system according to claim 1, wherein the plastic tubing is square shaped to provide more heat transfer surface area.

4. The system according to claim 1, wherein the tubing network is built into pre-constructed wall or ceiling panels.

5. The system according to claim 1, wherein the plastic tubing network is built into, on or behind plaster or drywall ceiling or wall construction, or other finishes or coverings.

6. The system according to claim 1, wherein the heat source heating the domestic hot water can be selected from natural gas, propane heat, heat pumps, solar, waste heat or geothermal.

7. The system according to claim 1, wherein the cool source cooling the domestic cold water can be selected from chillers, heat pumps, ground source, or geothermal or thermal storage.

8. The combined potable water surface heating and cooling system according to claim 1, wherein the system is incorporated directly into the construction of the structure in a hybrid three pipe configuration which can be switched from heating to cooling by changing the temperature of the heat transfer fluid from warm to cool.

9. The combined potable water surface heating and cooling system according to claim 1, wherein the system is incorporated directly into the construction of the structure in a two pipe configuration that changes from cooling to heating or in a four pipe configuration with a dedicated pipe for heating and a dedicated pipe for cooling.

* * * * *